United States Patent
Vainsencher et al.

(10) Patent No.: US 7,296,213 B2
(45) Date of Patent: Nov. 13, 2007

(54) ERROR CORRECTION CACHE FOR FLASH MEMORY

(75) Inventors: Leonardo Vainsencher, San Jose, CA (US); Cahide Kiris, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 832 days.

(21) Appl. No.: 10/316,401

(22) Filed: Dec. 11, 2002

(65) Prior Publication Data

US 2004/0117686 A1  Jun. 17, 2004

(51) Int. Cl.
*H03M 13/00* (2006.01)
*G11C 29/00* (2006.01)

(52) U.S. Cl. .................................................. 714/784
(58) Field of Classification Search ............... 714/784, 714/785

See application file for complete search history.

(56) References Cited

U.S. PATENT DOCUMENTS

| 5,956,743 A * | 9/1999 | Bruce et al. ............. 711/103 |
| 6,360,346 B1 * | 3/2002 | Miyauchi et al. ........ 714/763 |
| 6,438,706 B1 | 8/2002 | Brown |
| 6,639,843 B2 * | 10/2003 | Miyauchi ............ 365/185.29 |
| 6,684,289 B1 * | 1/2004 | Gonzalez et al. ........ 711/103 |

OTHER PUBLICATIONS

Flash Application Notes—Various ECC Algorithm Papers at http://www.samsungelectronics.com/semiconductors/flash/technical_data/application_notes.

* cited by examiner

*Primary Examiner*—Shelly Chase

(57) ABSTRACT

Systems and methods are disclosed to detect and correct errors in a flash memory using an error correction cache that provides error correction information by accessing data from a physical block number (PBN) of the flash memory; and if a data error occurred, applying error correction information stored in the cache corresponding to the accessed PBN to correct the data error.

22 Claims, 10 Drawing Sheets

ERROR CORRECTION CACHE FOR FLASH MEMORY

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO OTHER APPLICATIONS

This application is related to commonly owned application Ser. No. 10/316,462 entitled "ERROR CORRECTION FOR FLASH MEMORY," filed concurrently herewith, the content of which is incorporated by reference.

BACKGROUND

The present invention relates to error correction for flash memory.

Continuous improvements in price/performance for flash electrically-erasable programmable read-only memory have enabled flash memory to become the long term storage of choice for many applications. A flash memory is typically made from an array of floating-gate metal-oxide-silicon field effect transistors arranged as memory cells in typical row and column fashion with circuitry for accessing individual cells and placing the memory transistors of those cells in different memory conditions. Such memory transistors may be programmed by storing a charge on the floating gate. This charge remains when power is removed from the array. This charge (a "zero" or programmed condition) or its absence (a "one" or erased condition) may be detected when the device is read. Flash memory arrays are especially useful in portable computers where low power consumption is mandatory, space is at a premium and weight is important.

Two common flash memory architectures are NAND-type structure (NAND-flash) and NOR-type structure (NOR-flash). The NAND-flash serially arranges its memory cells while the NOR-flash arranges memory cells in parallel. An advantage of the NAND-type structure is faster sequential accessing than the NOR-type structure. In addition, the NAND-type structure supports faster write and erase operations and permits fabrication of higher density memory chips or smaller and less expensive chips of the same density.

During fabrication, flash memory devices may contain defective areas, and more defects may appear during the device lifetime, thereby limiting their usage. To manage these defects and to achieve efficient and reliable operation, digital systems typically use techniques to control errors and to ensure reliable data reproduction. For example, if hardware error occurs in a block of the array, that block of the array can be removed from operation. Blocks of flash memory are relatively expensive compared to other forms of storage, so this technique of having redundant/spare storage blocks is undesirable. Moreover, since only a limited number of spare blocks of flash memory are available in an array, this error correction approach eventually restricts the ability of the device to function.

A typical device (for example a Samsung K9F1208U0M 64M×8 flash memory) includes 16 extra bytes per 512-byte page. Manufacturers typically recommend error protection capability to detect 2-bit errors or to correct single bit errors on each device page (4096 bits). NAND-flash devices typically ship with an additional 16-byte area for each 512-byte page, for a total of 528 bytes. Some NAND-flash manufacturers rely on external ECC in order to support an extended number of write cycles per page/block. In the past, certain standards for NAND-flash file systems have been set, which include limited data protection. One such standard is the SmartMedia™ standard, mainly targeted for removable flash memory cards. This standard includes single-bit error correcting code that can also detect (but not correct) 2-bit errors per 256 bytes. The SmartMedia™ standard allocates 6 bytes for ECC related information per page. In addition, 2 bytes are used to duplicate logical block address information already included elsewhere. Therefore, a total of 8 bytes are allocated for this information. The SmartMedia™ standard sets aside bytes 0-511 for data storage and the following as an extra storage area: byte 516 for data status, byte 517 for block status, bytes 518-519 for block address field 1, bytes 520-522 for ECC field 2, bytes 523-524 for block address field 2, and bytes 525-527 for ECC field 1. The SmartMedia™ standard proposes the use of a Hamming-like code using 6 parity bytes (actually 22×2 bits). This code is capable of detecting up 2-bit errors and of correcting a single bit error per 256 bytes. However, the SmartMedia™ specification does not provide error detection and correction for the extra storage area.

U.S. Pat. No. 6,438,706 to Brown entitled "On Chip Error Correction For Devices In A Solid State Drive" provides an error correction arrangement for a flash memory with a plurality of redundant array circuits, a circuit for sensing when a hardware error has occurred in a block of the flash array, and a circuit for replacing an array circuit with a redundant array circuit in response to detection of a hardware error. However, this approach does not correct for one, two or three bits of errors.

As high-speed digital systems employing flash memory become more widely used and integral to day-to-day activities, individuals likely will depend more upon the efficient and reliable reproduction of the data stored in the flash memory of these digital systems.

SUMMARY

In one aspect, a system to detect and correct errors in a flash memory includes an error detection circuit coupled to the flash memory, the error detecting circuit determining if an error occurs in accessing data from a physical block number (PBN) from the flash memory; and an error correction cache coupled to the error detection circuit, the cache storing one or more PBN entries and error correction information for corresponding PBN entries.

In a second aspect, a method detects and corrects errors in a flash memory using an error correction cache that provides error correction information by accessing data from a PBN of the flash memory; and if a data error occurred, applying error correction information stored in the cache corresponding to the accessed PBN to correct the data error.

In a third aspect, a system to detect and correct errors in a flash memory includes a processor adapted to access data from a physical block number (PBN) from the flash memory; an error detection circuit connected to the flash memory and the processor, the error detecting circuit notifying the processor if an error occurs in the accessed PBN;

and an error correction cache to store one or more PBN entries and error correction information for corresponding PBN entries.

Advantages of the invention may include one or more of the following. The cache enables certain pages with a few errors to be usable, at least for an extended period before the errors increase to a point that renders an error prone flash memory block unusable. Data reliability and device life is enhanced by keeping "mildly" flawed pages in use, taking advantage of extended error correcting capability. Through three ECC modes, powerful codes capable of correcting single, double, or even triple random errors can be handled. At the same time, the system minimizes the need for redundant/spare storage and maintains compatibility with existing NAND-flash file system standards, such as the SmartMedia™ standard specifications. The system also allows digital systems using NAND-flash memory devices to be efficient and reliable. This is important in case of non-removable flash memory media.

BRIEF DESCRIPTION OF THE FIGURES

In order that the manner in which the above-recited and other advantages and features of the invention are obtained, a more particular description of the invention briefly described above will be rendered by reference to specific embodiments thereof, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which.

DESCRIPTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. While the following detailed description of the present invention describes its application in the area involving a graphics/display controller, it is to be appreciated that the present invention is also applicable to any application involving multiple data paths such as communications, core logic, central processing units (CPU), and others.

In accordance to one embodiment, an Error Processor (EP) supports three different error detection and correction modes: SmartMedia™ mode and two different Reed-Solomon Error Correction modes. Through the three ECC modes, powerful codes are used to correct single, double, or even triple random errors. These capabilities are provided while minimizing the need for redundant storage and maintaining compatibility with existing NAND-flash file system standards, such as the SmartMedia™ standard specifications.

Figure 1A:
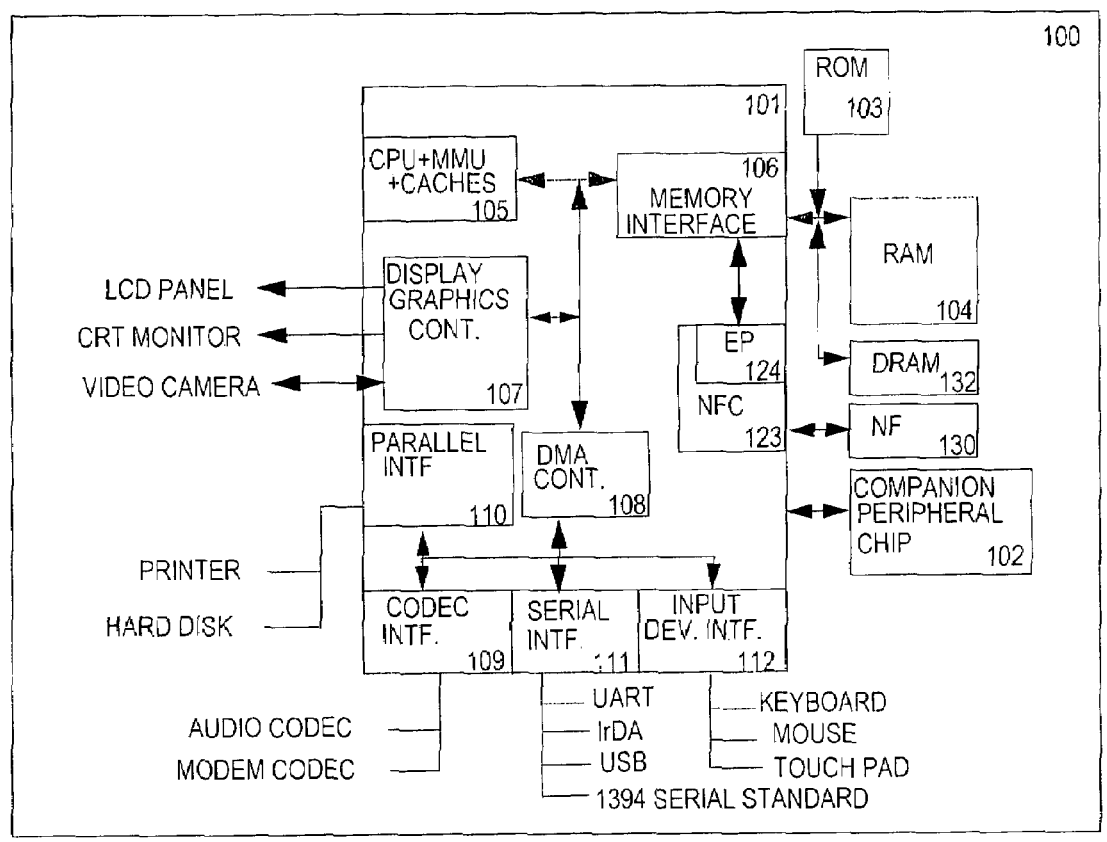
FIG. 1A shows a block diagram of a system embodying ECC.

Referring now to the drawings in greater detail, there is illustrated therein structure diagrams for an error correction engine and logic flow diagrams for processes that a system will utilize to correct errors for a flash memory device, as will be more readily understood from a study of the diagrams. Reference is now made to FIG. 1A illustrates, for example, a high-level diagram of computer system 100 upon which the present invention may be implemented or practiced. More particularly, computer system 100 may be a laptop or hand-held computer system. It is to be appreciated that computer system 100 is exemplary only and that the present invention can operate within a number of different computer systems including desk-top computer systems, general purpose computer systems, embedded computer systems, and others.

In FIG. 1A, computer system 100 is a highly integrated system which includes of integrated processor circuit 101, peripheral controller 102, read-only-memory (ROM) 103, and random access memory (RAM) 104. The highly integrated architecture allows power to be conserved. Computer system architecture 100 may also include a peripheral controller if there is a need to interface with complex and/or high pin-count peripherals that are not provided in integrated processor circuit 101.

While peripheral controller 102 is connected to integrated processor circuit 101 on one end, ROM 103 and RAM 104 are connected to integrated processor circuit 101 on the other end. Integrated processor circuit 101 comprises a processing unit 105, memory interface 106, graphics/display controller 107, direct memory access (DMA) controller 108, and core logic functions including encoder/decoder (CODEC) interface 109, parallel interface 110, serial interface 111, and input device interface 112. Processing unit 105 integrates a central processing unit (CPU), a memory management unit (MMU), together with instruction/data caches.

CODEC interface 109 provides the interface for an audio source and/or modem to connect to integrated processor circuit 101. Parallel interface 110 allows parallel input/output (I/O) devices such as hard disks, printers, etc. to connect to integrated processor circuit 101. Serial interface 111 provides the interface for serial I/O devices such as universal asynchronous receiver transmitter (UART) to connect to integrated processor circuit 101. Input device interface 112 provides the interface for input devices such as keyboard, mouse, and touch pad to connect to integrated processor circuit 101.

DMA controller 108 accesses data stored in RAM 104 via memory interface 106 and provides the data to peripheral devices connected to CODEC interface 109, parallel interface 110, serial interface 111, or input device interface 112. Graphics/display controller 107 requests and accesses the video/graphics data from RAM 104 via memory interface 106. Graphics/display controller 107 then processes the data, formats the processed data, and sends the formatted data to a display device such as a liquid crystal display (LCD), a cathode ray tube (CRT), or a television (TV) monitor. In computer system 100, a single memory bus is used to connect integrated processor circuit 101 to ROM 103 and RAM 104.

In one embodiment, digital system 100 includes an ECC processor (EP) 124 that communicates with DMA controller 108 and memory interface 106. In another embodiment, DMA controller 108 is part of a NAND-flash controller that further includes the ECC processor. DMA controller 108 moves data from a peripheral device, such as a flash memory card, directly to system memory without requiring the involvement of CPU 105. The DMA controller 108 allows the system to continue processing other tasks while new data is being retrieved. ECC processor 124 performs ECC related operations to compensate for errors caused by defects and to maintain data integrity. ECC processor 124 also provides status information to Error Correction software which may be stored in ROM 103 and executed by CPU 105 to facilitate error correction and also provides an appropriate indication of the existence of errors.

Memory interface 106 is fed by and electrically connected to DMA controller 108 and ECC processor 124. Memory interface 106 drives a communications bus that feeds RAM 104 that can include DRAM 132. A NAND-Flash Controller (NFC) 123 drives a NAND-Flash (NF) memory 130. Memory interface 106 performs the standard interface functions, such as code conversion, protocol conversion, and buffering, required for communications to and from a peripheral. Memory interface 106 allows a number of independent devices with varying protocols to communicate with each other. NF 130 is representative of any well-known NAND-flash memory, which is an electrically erasable, non-volatile memory device that retains its data even after the power is removed. NAND-flash memory devices are well-suited for cellular phones, digital music players, handheld computers, digital cameras, camcorders, and digital voice recorders, where performance is critical.

For usage modes that require a high volume of NAND-flash re-writes, a combination of high data reliability, large volume of re-writes, and support for long device life is desirable. To satisfy these requirements, digital system 100 uses ECCs that can correct double or even triple random errors. At the same time, digital system 100 minimizes redundant/spare storage and attempts to maintain compatibility with at least one existing NAND flash file system standard.

Digital system 100 provides three ECC modes, two of which rely on Reed Solomon (RS) codes. Each RS code word contains data and error correcting information. RS codes work by encoding data according to certain predetermined rules to produce encoded data having a known format. The encoded data might then be transmitted to a receiver that, knowing the predetermined rules and the known format, often can detect errors in the received data by comparing it to the known format. If any differences exist, an error has occurred. Using certain rules, the receiver often can correct errors detected in this manner. After such correction, the corrected data can then be converted back from its encoded format to obtain the original data. The process of detecting, or detecting and correcting, errors and converting the encoded data back to its original form is called decoding.

The three ECC codes are as follows:

1) H221 mode: H221 mode is compatible with the SmartMedia™ standard.

2) Reed-Solomon-52 (RS52) mode: RS52 mode utilizes the same 6 ECC bytes as the SmartMedia™ standard, and additionally protects against any two symbol errors, including those in the extra area. In the context of RS codes discussed herein, a symbol represents a string of 9 contiguous bits. Any number of bit errors within the same symbol is still considered as one symbol error. Mode RS52 maintains compatibility with SmartMedia™ except for the way the 6 bytes are computed and used to detect errors.

3) Reed-Solomon-73 (RS73) mode: RS73 mode utilizes the last 8 bytes of the page (bytes 520 thru 527) as parity, providing protection against any three symbol errors, including the extra area. RS73 is the preferred mode of operation for maximum reliability and longest flash memory life cycle. The two extra bytes (bytes 523-524) used in this mode are simply copies of bytes 518-519 of the SmartMedia standard.

For the RS codes, the starting point for error correction is the syndrome coefficients. Those coefficients are used in the algorithm that locates and corrects errors. The extended error protection capability provided by RS73 and RS52 makes it feasible to continue to use pages containing errors. For example, if RS73 is used, up to two random symbol errors could be tolerated, because if a third error appears, it is still corrected. Depending on the policy enforced by the application, a page-replacement algorithm may be invoked to assign a replacement page once the error protection capability is close to or at the limit of what the code used can provide.

Repeated access to pages with errors would trigger the process intensive error correction algorithm. Under the control of ECC processor 124, digital system 100 of the present invention circumvents those situations by caching corrected pages in DRAM 132. Alternatively, instead of caching entire pages, information of how to correct known errors is cached in DRAM 132. It takes two 9-bit words in order to correct each error, or 36 bits for two errors. This approach significantly reduces error correction overhead, both in time and in memory space. Furthermore, the approach of not immediately discarding and replacing pages that are only "mildly" flawed can lead to tremendous increase in data reliability and device life. This is especially important in case of non-removable storage media.

Figure 1B:
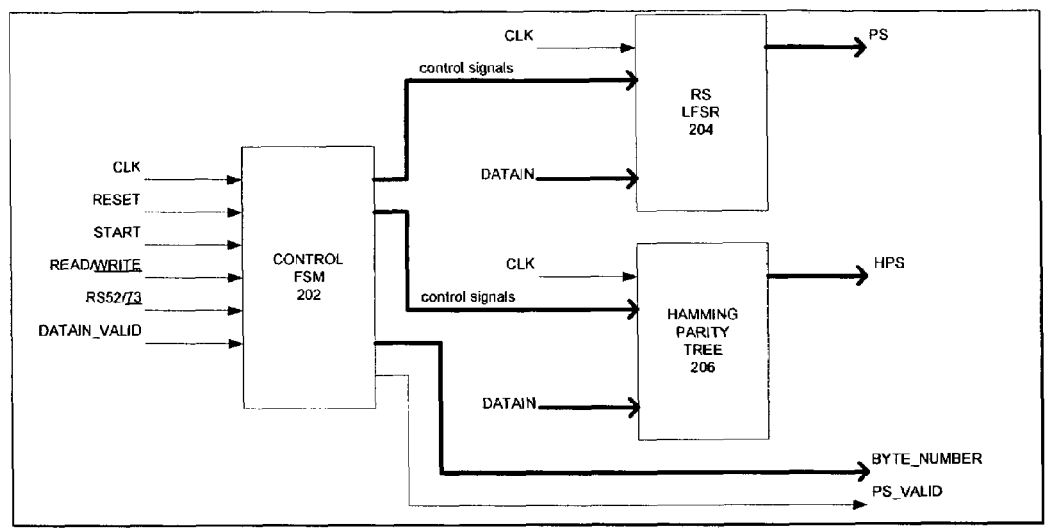
FIG. 1B shows a block diagram of an exemplary error processor (EP).

FIG. 1B shows one implementation of the EP 124. The EP 124 includes a control finite state machine (FSM) 202 which receives clock, reset, start, read/write, RS mode, and data valid input signals. The FSM 202 includes a counter that, based on the data input, is incremented at predetermined intervals and generates as outputs a byte number and a parity/syndrome valid signal (PS_VALID). The FSM 202 also generates control signals to an RS linear feedback shift register (LFSR) block 204 for the RS-XX modes and a Hamming parity tree 206 for the H221 mode. The LFSR block 204 is discussed in more detail below, and the output of the LFSR block 204 is a parity/syndrome bus—PS. The H221 mode is always enabled and produces parity/syndrome bytes on a separate output bus—HPS. The parity tree 206 implements a Hamming tree known to those skilled in the art, and one implementation is attached in the Appendix.

In operation, ECC processor 124 accepts input data bytes from DRAM 132 and generates either parity or syndrome bits, depending on whether a write or a read is performed, respectively. After all incoming bytes are processed, ECC processor 124 produces a 64-bit word containing parity information to be written to NF 130 or, in case of a NAND-flash to DRAM transfer, syndrome information to be examined by ECC software executed by processor 105. The number of bytes required by ECC processor 124 varies depending on the mode, but in one embodiment it requires more than 520 bytes.

During read operations from NAND-flash memory, memory interface 106 sends data bytes retrieved from NAND-flash to both ECC processor 114 and DRAM in parallel. All 528 bytes are transferred to DRAM directly by memory interface 106. Memory interface 106 continues sending data bytes to ECC processor 124 (in one implementation, "dummy" bytes) until an indication is given that the parity/syndrome word has been computed and whose value is valid. At that point, the parity/syndrome word is checked to see if it is zero. If a non-zero value is detected, an error has occurred and a flag is set to indicate the error to the error correction software executed by the processor 105.

A copy of the syndrome is made available (readable) to error correction software executed by the processor 105. In one embodiment, executed error correction software performs correction based on Euclid method, although any other suitable error correction methods can be used. The error correction software can be software described in Error-Correction Coding for Digital Communications by George C. Clark and J. Bibb Cain, Plenum Pub Corp (June 198) or in Error Control Coding by Shu Lin and Daniel J. Costello, Prentice Hall (October 1982), the contents of which are hereby-incorporated by reference.

Figure 2:
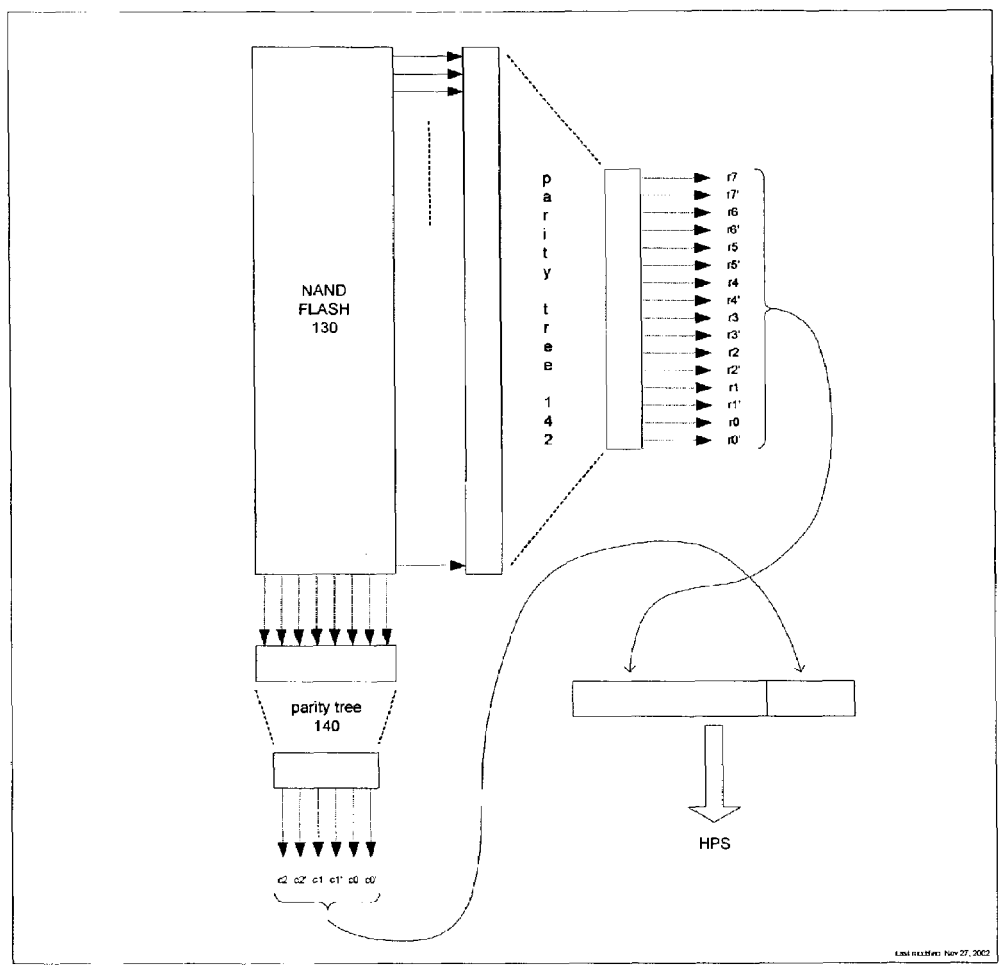
FIG. 2 shows a parity code generator for a first ECC mode.

FIG. 2 shows a parity code generator for the H221 mode. This mode is compatible with the SmartMedia specification. The method employed in this mode applies modified Hamming code (single bit error correcting code) to row and column parity arrays 140 and 142, respectively. In one embodiment, row parity array 140 is 256 bits long (one parity bit per byte). Column parity array 142 has 8 bits. The output of the row and column parity arrays 140 and 142 is a Hamming parity/syndrome (HPS) output. HPS contains separate fields for top and bottom 256 bytes within the page. However, the extra 16-byte area is not protected in H221 mode.

If a single bit flips within the 256×8 data array from NF 130, exactly one column parity bit and one row parity bit will flip as well. By determining the location of these two flipped bits (row & column), the location of the single flip bit within the data array is uniquely determined. The modified Hamming code, applied separately to row and column parity arrays, detects single bit errors in each of parity arrays 140 and 142. The parity generation matrix applied to each parity array generates the actual parity bits (for example, parity of parity) stored in NF 130.

The H221 mode is always enabled and produces parity/syndrome bytes on a separate output bus—HPS. In one embodiment, at the expense of an increased number of computations, the chosen parity matrices directly generate the location of the error. The parity matrix is computed so that for each possible error position, ½ of the parity bits directly indicate the error offset while the other ½ bits are simply 1's complement of the first ½ of the parity bits. Therefore in this exemplary embodiment, 2×3 or 6 bits are required to indicate offset within a byte (column) and 2×8 or 16 bits are needed to indicate byte offset (row), for a total of 22 parity bits. In order to cover all 512 data bytes, 2 sets of 22 bits are required. More information on the H221 mode is discussed in the SmartMedia standard and in flash memory manufacturer's application notes, for example Samsung's Application Notes located at http://www.samsungelectronics.com/semiconductors/flash/technical_data/application_notes.

Figure 3:
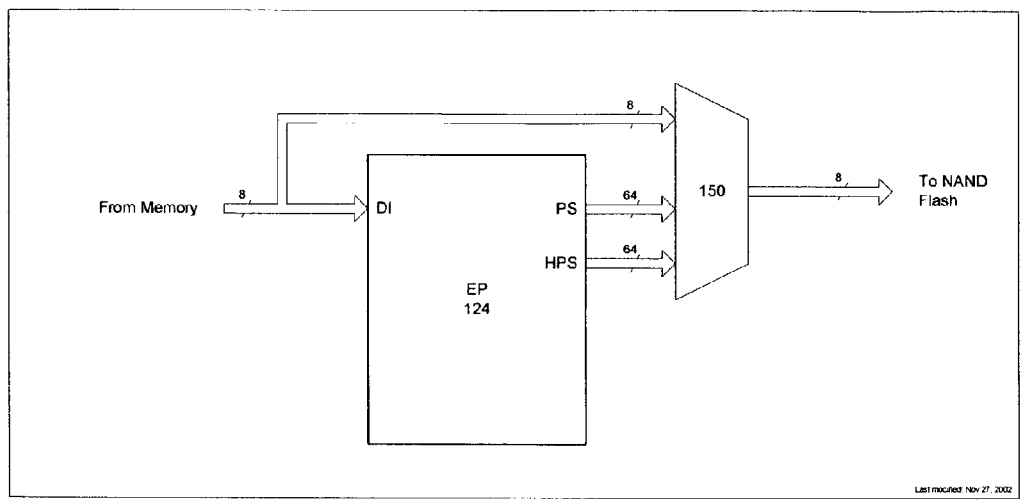
FIG. 3 shows a diagram illustrating an error corrected NAND flash memory write mode.

Next, operations relating to RS-modes are discussed. FIG. 3 shows a diagram illustrating an error corrected NAND flash memory write mode. Memory interface 106 sends data originating from another memory to both EP 124 and NAND Flash memory 130, until a predetermined amount of data, for example 520 bytes, have been sent to NF 130. Subsequently, memory interface 106 stops sending data to NF 130 but continues to send data to EP 124 (up to 8 more bytes), while monitoring a PSV signal. PSV is asserted when RS parity/syndrome (PS) data is valid or when HPS data is valid. When PSV is detected high, memory interface 106 may stop sending data to EP 124; at this point memory interface 106 selects bytes from a PS port/bus or from the HPS port/bus in case of H221 mode (depending on whether the RSXX mode or the H221 mode is being used) to complete the remaining 8 bytes not yet sent to NF 130. These remaining 8 bytes are sent to registers that are accessible by ECC software. In one embodiment, output bytes 520 . . . 527 sent to NF 130 correspond to PS (HPS) bits <63:56> . . . <7:0>, respectively.

Figure 4:
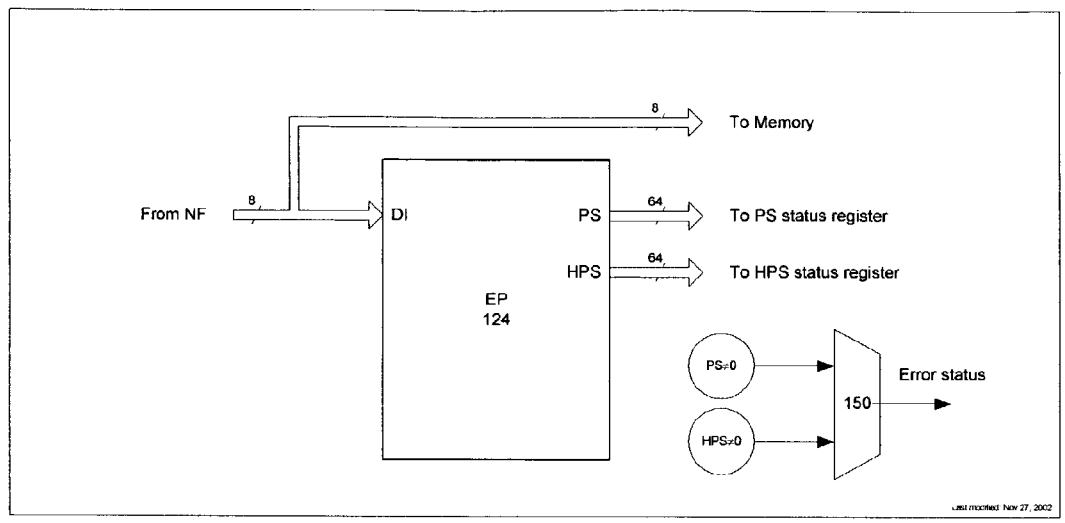
FIG. 4 shows a diagram illustrating an error corrected NAND flash memory read mode.

FIG. 4 shows a diagram illustrating an error corrected NAND flash memory read mode. Thus, data flows from the NAND flash memory to the EP 124 and the PS and HPS data are sent over their respective buses. During a read operation, EP 124 computes Hamming code syndrome as bit-wise XOR of the received data bytes parity words and the parity words stored in the extended area. The result of this XOR operation is zero if no errors are present. In case of a single bit error, affected syndromes have exactly 11 non-zero bits mixed with exactly 11 zero bits. The odd numbered bits, taken as a group, will indicate bit (3 lsbs) and byte offsets (8 msbs) of where the error occurred.

In one embodiment, the 528 incoming bytes from NF 130 are transferred to the other memory device such as DRAM 132. As discussed earlier, memory interface 106 monitors PSV signal. When PSV is asserted, memory interface 106 copies syndrome words from PS and HPS ports/buses to status registers accessible by error correction software. Memory interface 106 also updates an error status flag through the multiplexer 150 if PS or HPS is not zero in this embodiment. In the H221 mode, the multiplexer 150 provides the comparison HPS<>0 as an output, while in the RSXX mode, the multiplexer 150 provides PS<>0 as an output.

In another implementation, one set of 64 bit syndrome registers is saved to allow error correction software access to only one syndrome word corresponding to the mode selected. Alternatively, since PS and HPS ports remain unchanged until a new operation is started, the implementation can optionally make PS and HPS available directly, without shadow copies.

The mathematical operations behind RS73 and RS52 modes are discussed next. Let the following polynomial over the Galois Field GF(2) be the generator polynomial for $GF(2^9)$ $$f(x)=x^9+x^4+1$$

This polynomial is a primitive polynomial. Primitive polynomial are identified by computer search and are extensively tabulated in the literature. In case of RS73 mode, the corresponding code generator polynomial is, $$g(X)=X^7+127X^6+128X^5+146X^4+178X^3+196X^2+86X^1+76$$

Whereas in mode RS52 the code generator polynomial is, $$g(X)=X^5+31X^4+198X^3+265X^2+499X^1+34$$

Mode RS73 uses (n=470,k=463,t=3) RS code over $GF(2^9)$. RS73 mode covers bytes 0-519, requiring k=463 9-bit data symbols. Mode RS52 uses (n=469,k=464,t=2) RS code over GF($2^9$). Mode RS52 covers bytes 0-519 and 523-524, for a total of 522 bytes. This requires k=464 9-bit data symbols.

In one embodiment, code symbols are 9-bit long, whereas NF data is 8-bit long (bytes). For the purpose of parity/syndrome computations, incoming bytes are packed into 9-bit symbols. Packing is done msb first and left justified, that is, msb (bit 7) of $1^{st}$ byte, coincides with msb (bit 8) of $1^{st}$ symbol, msb of $2^{nd}$ byte, coincides with lsb (bit 0) of first symbol, for example.

RS (n, k, t) code is defined as a set of codewords satisfying certain algebraic properties. Let M(X) be a polynomial of degree k−1, where its coefficients are k message (data) symbols. That is, $$M(X) = \sum_{j=0}^{k-1} m_j X^j$$

By convention, $m_{k-1}$ is the first data symbol.

Let C(X) be a polynomial of degree n−1, whose coefficients are the n code symbols.

$$C(X) = \sum_{j=0}^{n-1} c_j X^j$$

RS (n, k, t) code is defined such that C(X) is a codeword if and only if $C(\alpha^j)=0$, for j=0,1, . . . , 2t−1, where α is a primitive element of GF($2^9$). That is, C(X) has 2t roots which are consecutive powers of α. The implication is that C(X) must have a factor G(X) such that, $$G(X) = \prod_{j=0}^{2t-1} (X - \alpha^j)$$

G(X) is the code generator polynomial. G(X) is a degree 2t polynomial whose roots are 2t consecutive powers of α. Note that since GF($2^9$) has characteristic 2, addition and subtraction produce the same results, therefore G(X) can also be written as $$G(X) = \prod_{j=0}^{2t-1} (X + \alpha^j)$$

Also, since by definition α is primitive, G(X) roots are all distinct.

Given the generator polynomial, RS systematic codewords are constructed as $$C(X) = [M(X) \cdot X^{2t}] + \{[M(X) \cdot X^{2t}] \bmod G(X)\}$$

C(X) as defined above is guaranteed to meet the requirement $C(\alpha^j)=0$, j=0 . . . 2t−1. The $2^{nd}$ term in the expression above is the parity polynomial (degree 2t−1) and can be efficiently computed using a linear feedback shift register (LFSR) structure. The $1^{st}$ term is merely the original message polynomial left-shifted 2t positions.

When the codeword (represented by C(X)) is retrieved, the ECC processor computes $S_j=C(\alpha^j)$, j=0 . . . 2t−1. If C(X) has no errors, then by definition, all $S_j$ are 0. If C(X) has at least one but no more than t symbol errors, then $S_j \neq 0$ for some j. Furthermore, the Sj values computed can be used to uniquely determine the location and values of the errors. Sj are the syndrome coefficients.

Figure 5:
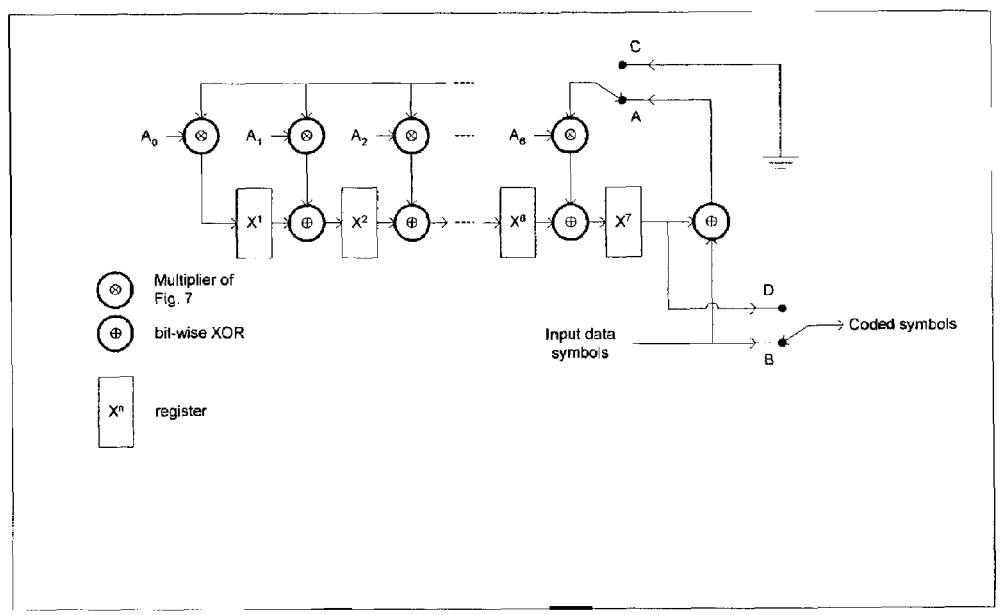
FIG. 5 shows a diagram of an exemplary parity generator for an RS73 mode.

The EP 124 architecture includes logic that implements all necessary mathematical functions and the required arithmetic blocks, along with simple control sequencer logic. EP essentially performs 3 functions:
- Calculation of polynomial remainder, for RS parity generation
- Calculation of the value of a polynomial at a given point, for RS syndrome generation
- Calculation of binary matrix/vector multiplication, for Hamming parity and syndrome generation FIG. 5 shows a diagram of an exemplary parity generator for the RS73 mode which implements the RS73 code generator polynomial discussed earlier. This structure is known as a linear feedback shift-register, or LFSR. A similar structure is used for the RS52 mode. In FIG. 5, each of LFSR coefficients A0-A6 is provided to a multiplier (shown in FIG. 7). The output of the multiplier for A0 is stored in register X1. The output of register X1 is provided to a bit-wise exclusive OR (XOR) that receives the output of the multiplier for A1. The output of the bit-wise XOR is stored as register X2. These stages are repeated until the last stage, where the output of register X6 is added to the output of the multiplier for A6 and stored in register X7. The output of register X7 is provided to a bit-wise XOR that receives input data symbol at B terminal of a first switch. The output of the last bit-wise XOR is provided as the second input for the multiplier for A6 through an A terminal of a second switch.

In one embodiment, LFSR coefficients have the following values:
A0=76
A1=86
A2=196
A3=178
A4=146
A5=128
A6=127

In this embodiment, switches set to "AB" for first 463 symbols (9 bits each). Switches set to "CD" for 7 additional symbols. 463 input symbols are produced from 520 original data bytes. 7 parity symbols are converted to 8 output bytes. Registers are also initialized to zero before shifting-in data symbols.

Figure 6:
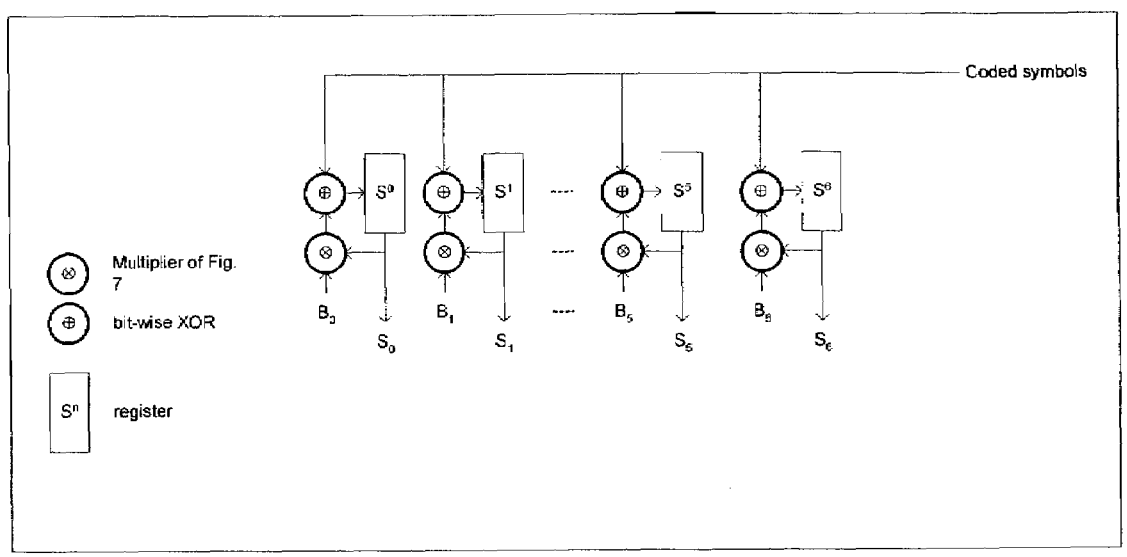
FIG. 6 contains a diagram for RS73 syndrome computation.

FIG. 6 contains a diagram for the syndrome computation for the RS73 mode. A similar structure is used for the RS52 mode. The structure of FIG. 6 calculates the value of the code polynomial at points $B_j$ (multiplier factors in the figure). Error detection consists of checking the syndrome coefficients. If all syndrome coefficients are zero then with high probability, data is error-free. In this embodiment, seven stages are provided for syndrome S0-S6. The inputs to each stage j are coded symbols provided to a bit-wise XOR. The output of the adder is stored in a register for each $S_j$ and provided as an input to a multiplier. The other input of the multiplier is $B_j$. Each syndrome coefficient Sj becomes valid after 470 codeword symbols are shifted in. In this embodiment, registers storing $S_j$'s are initialized to zero before shifting-in codeword symbols.

Figure 7:
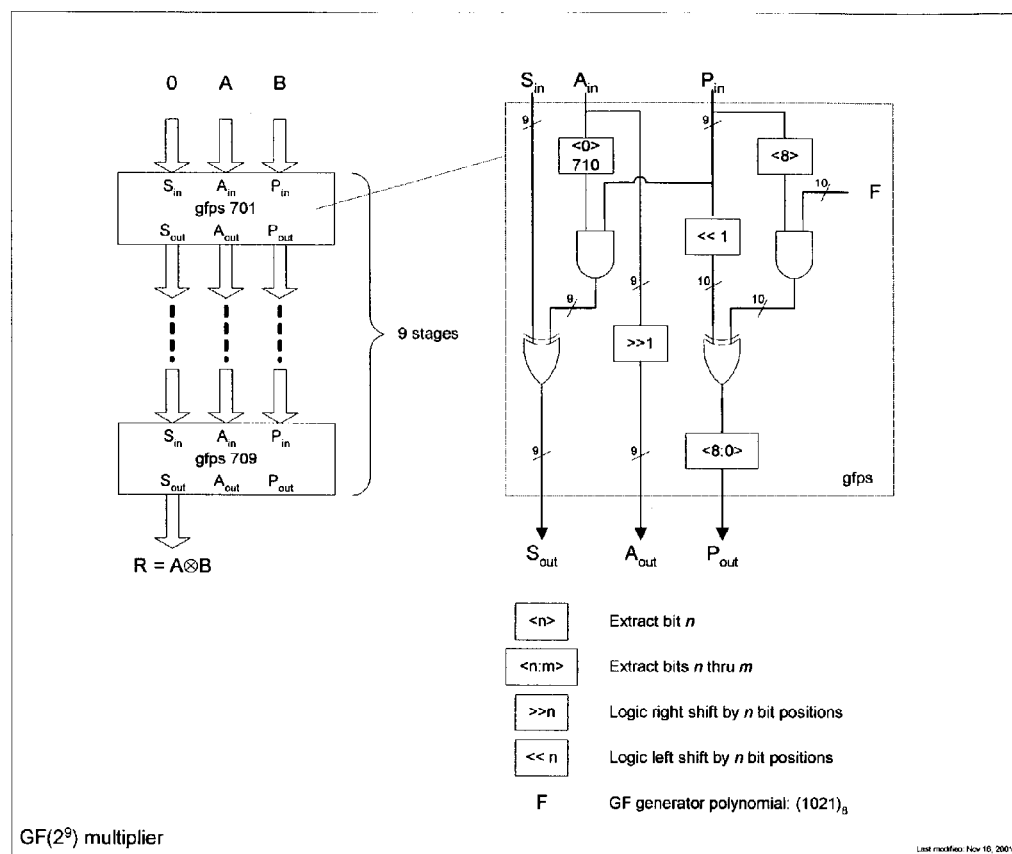
FIG. 7 describes the structure of a $GF(2^9)$ multiplier.

FIG. 7 describes the structure of a GF($2^9$) multiplier. A similar structure is used for the RS52 mode. In the embodiment of FIG. 7, nine GF stages are used. The first stage receives A and B values and provide Sout, Aout and Pout as outputs. The outputs of the previous stage are provided as inputs to the next stage.

Each stage receives Ain and Pin as inputs. Ain is provided to a bit extractor and to a right shifter, whose output is Aout. Similarly, Pin is provided to another bit extractor and to a left shifter. The output of the second bit extractor for Pin and an F input (GF generator polynomial) are provided to an array of AND gates. The output of the AND gates and the left shifter are exclusive ORed and bits 0-8 are provided as Pout. Correspondingly, the output of the first extractor and Pin are ANDed together, and the output of the AND array is exclusive ORed with Sin to provide Sout.

The above circuits generate parity values and syndrome values. The error correction is done in software and executed by processor 105. Exemplary C++ methods here for parity generation—pgen( ), syndrome generation—sgen( ) and error correction—efix( ) are shown below:

```
// generates parity symbols
// dinp = input data (K symbols)
// pout = output parity buffer (N-K symbols)
void
pgen (const int* dinp, int* pout) const
{
    int j,p;
    for (j=0 ; j < K ; j++) {
        int fb = add(pout[N-K-1],dinp[j]);
        for (p=N-K-1 ; p >= 0 ; p--) {
            int m = gf2mul(fb,(*G)[p]);
            pout[p] = p ? gf2add(pout[p-1],m) : m;
        }
    }
}
// syndrome coefficients generator
// cinp = code word (N symbols), data+parity
// sout = output syndrome coefficients (T symbols)
// return value: 0 : code word is clean
//              !=0 : code word has errors
int
sgen (const int* cinp, int* sout) const
{
    int j,p;
    for (j=0 ; j < N ; j++) {
        for (p=0 ; p < (N-K) ; p++) {
            sout[p] = gf2mul(sout[p],sf[p]);
            sout[p] = gf2add(sout[p],cinp[j]);
        }
    }
    for (p=0 ; p < (N-K) ; p++) {
        if (sout[p])
            return(1);
    }
    return(0);
}
// error correction
// cinp = input code word (N symbols), data+parity
// sinp = input syndrome coefficients (T symbols)
// dout = corrected data output (N symbols), data+parity
// return value: 0 : no errors detected
//              >0 : number of errors corrected (<= T)
//              <0 : uncorrectable errors found
int
efix (const int* cinp, const int* sinp, int* dout) const
{
    int k,ner;
    memcpy(dout,cinp,N*sizeof(*dout));
    for (ner=k=0 ; k < (N-K) ; k++)
        ner |= sinp[k];
    if (ner==0)
        return(0);
    Cpoly cp(N-1,cinp,gf);    // code word polynomial
    ner = elv(sinp);          // compute error locations and values
    // loc= array of error locations
    // val= array of error values
    for (k=0 ; k < ner ; k++) {
        // correct k-th error
        int lk = loc[k];
        int nc = gf2sub(cp[lk],val[k]);
        cp.set(lk,nc);
        lk = N-1-lk;
        nc = gf2sub(dout[lk],val[k]);
        dout[lk] = nc;
    }
    return(ner);
}
```

Repeated access to pages with errors would trigger the expensive error correction algorithm, perhaps too often. The proposed implementation helps avoid performance degradation, due to frequent accesses to pages with errors, by caching corrected pages in DRAM. This cache is managed by the software executed by processor 105 and is transparent to the application. The software driver is not required to cache entire pages, but instead just the information needed to correct known errors. It takes two 9-bit numbers in order to correct each error, or 36 bits for 2 errors. This approach significantly reduces error correction overhead, both in time and in memory space. In addition, the syndrome value and block physical/logical address in the form of Physical Block Number (PBN) should be saved along with the information about known errors in an Error Correction (EC). When an error is detected, the resulting syndrome (computed in hardware) is compared with the saved syndrome. If they are identical, then with high-probability the error pattern has not changed since the last correction; therefore the saved error information can be used to correct the block, without having to run the full error correction procedure.

Figure 8A:
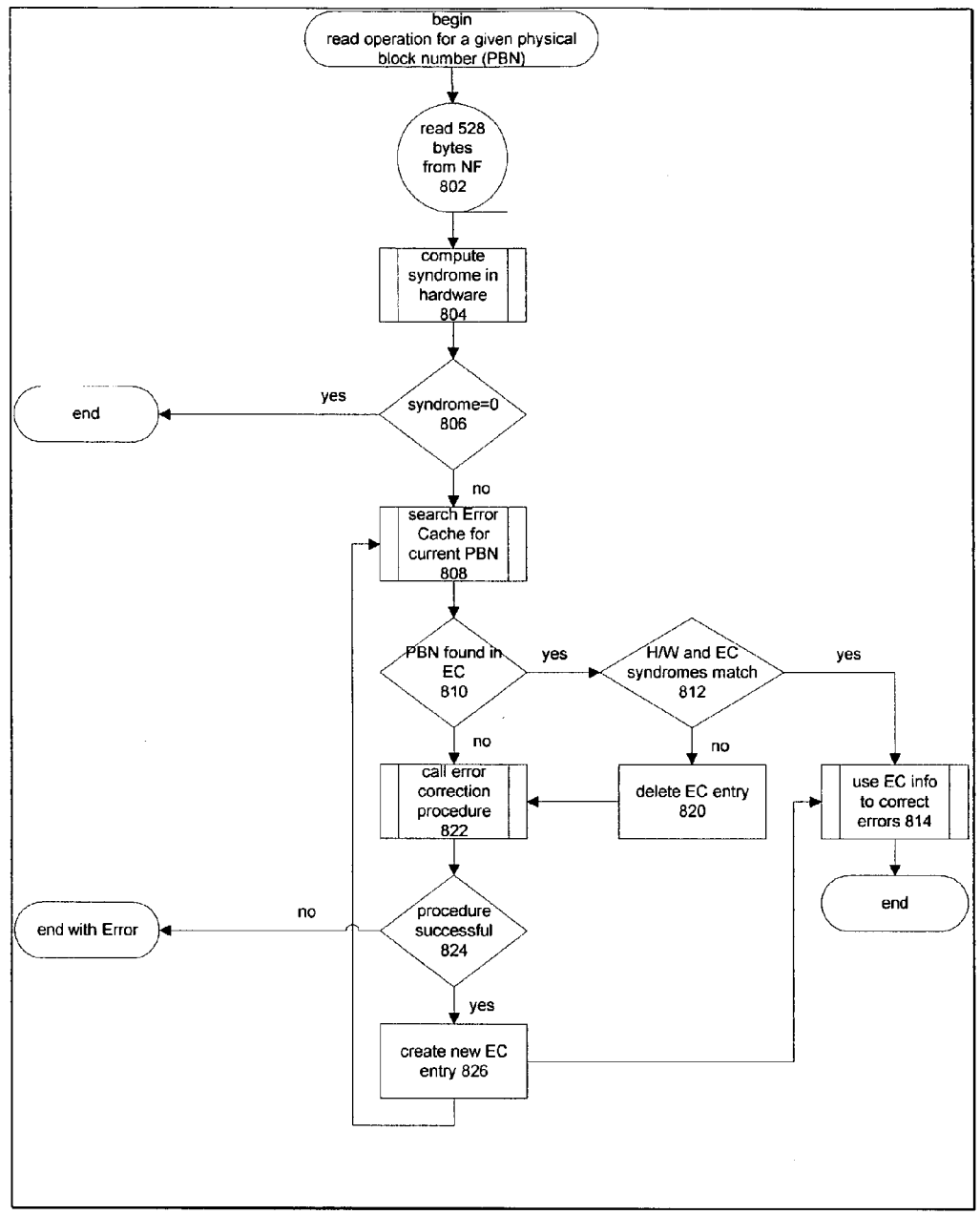
FIG. 8A shows an exemplary flow chart of a process to correct error using a cache.

FIG. 8A shows an exemplary flow chart of a process to correct error using a cache. The process of FIG. 8A is started when a read operation for a given physical block number (PBN) is requested. A block of data of predetermined size (for example 528 bytes) is read from NAND flash memory (802). A syndrome value for the retrieved block from NAND flash is computed (804). Next, the syndrome value is checked (806) If the syndrome is zero, no error occurred and the process exits. Alternatively, if the syndrome value is not zero, an error had occurred. 802-806 are done in hardware, while the remaining operations are done by the processor 105 of FIG. 1.

From 806, if the syndrome value is non-zero, the process of FIG. 8A searches an error cache for an entry matching the current PBN (808). If the PBN is found in the error cache (810), the process checks whether the syndrome value generated by the hardware matches the syndrome value stored in the error cache (812). If so, the process uses the syndrome stored in the error cache to correct the error (814) and exits. Alternatively, if the hardware generated syndrome value and the syndrome value cached in a corresponding entry in the error cache do not match, the entry in the error cache is deleted (820). From 810 or 820, the process calls an error correction procedure (822). Next, the process checks whether the operation 822 is successful (824). If not, the process ends with an error since physical block data can not be recovered. Alternatively, if the procedure 824 was successful, a new error cache entry is created (826). The process can then loop back to 808 or to 814 to handle the read operation.

The pseudo-code for the error correction procedure with caching is as follows:
1. Transfer NF page to DRAM (using DMA)
2. If NFC signals no read error has occurred, exit this procedure
3. Search Error Cache (EC) for current NF physical block number (PBN)
4. If PBN not found, go to step 8
5. Compare syndrome value stored in EC entry against the syndrome calculated by NFC
6. If syndromes match, use info in EC entry to correct error and exit this procedure
7. Delete EC entry
8. Run Error Correction Procedure based on syndrome computed by NFC
9. If ECP runs successfully, go to step 11
10. Mark NF page as unrecoverable and exit this procedure
11. Create new EC entry and save PBN, syndrome value, error location indexes, error values; go to step 5

Figure 8B:
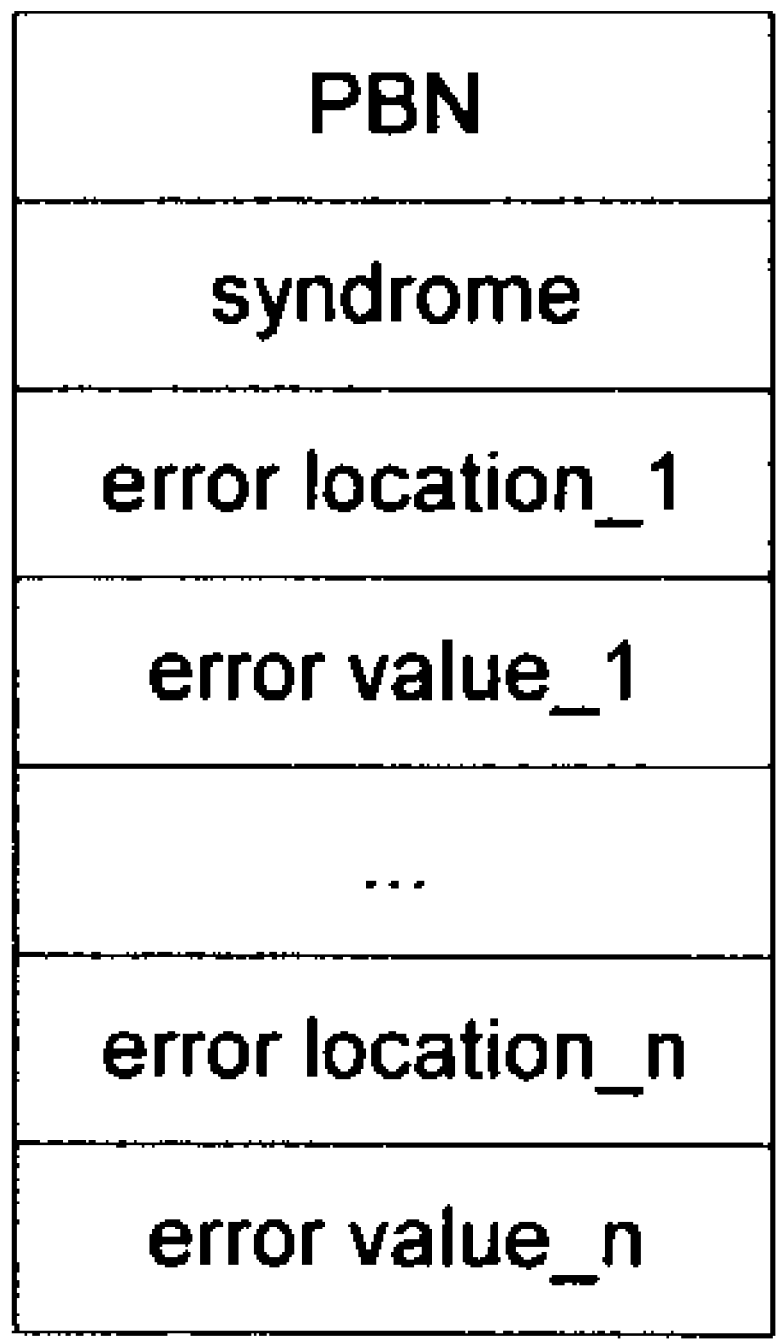
FIG. 8B shows an exemplary error correction entry structure.

FIG. 8B shows an exemplary error correction entry structure for the process of FIG. 8A and for the above pseudo-code. For each PBN, a syndrome storage area is allocated. In addition, for each of "n" error locations, an error location storage area and an error value storage area is allocated. During operation, when a particular PBN is accessed and an error occurs, the processor checks the cache to see if the cache contains the PBN. If so, the syndrome value is retrieved and the process of FIG. 8A is executed. Moreover, the process also tracks the location of the error and the error value for statistical purposes.

The above operations enable certain pages with a few errors to be usable, at least for an extended period before the errors increase to a point that renders the flash memory block unusable. A significant increase in data reliability and device life is achieved by keeping "mildly" flawed pages in use, taking advantage of the extended error correcting capability provided by modes RS52 and RS73. This is important in case of non-removable media.

It is to be understood that various terms employed in the description herein are interchangeable. Accordingly, the above description of the invention is illustrative and not limiting. Further modifications will be apparent to one of ordinary skill in the art in light of this disclosure. Thus, although primarily intended to be used in audio-visual environment such as cellular telephones or portable computers and PDAs, this invention is also applicable in any data storage environment. Examples of such environment include but are not limited to software and games delivery systems, digital books and collaborative creation of documents. Moreover, although the invention has been discussed with reference to SmartMedia, a variety of different memory card standards, including flash memory cards, MM cards (multi-media cards), SD cards (secure digital cards), MD cards (mini disk cards); or CF card (compact flash card), can be used as well.

The invention has been described in terms of specific examples which are illustrative only and are not to be construed as limiting. The invention may be implemented in digital electronic circuitry or in computer hardware, firmware, software, or in combinations of them. Apparatus of the invention may be implemented in a computer program product tangibly embodied in a machine-readable storage device for execution by a computer processor; and method steps of the invention may be performed by a computer processor executing a program to perform functions of the invention by operating on input data and generating output.

Suitable processors include, by way of example, both general and special purpose microprocessors. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; optical media such as CD-ROM disks; and magneto-optical devices. Any of the foregoing may be supplemented by, or incorporated in, specially-designed application-specific integrated circuits (ASICs) or suitably programmed field programmable gate arrays (FPGAs).

While the preferred forms of the invention have been shown in the drawings and described herein, the invention should not be construed as limited to the specific forms shown and described since variations of the preferred forms will be apparent to those skilled in the art. Thus the scope of the invention is defined by the following claims and their equivalents.

APPENDIX

```
/*****************************************************/
/* Description : The following source code shows an example for   */
/* generating of 3bytes per 256bytes, based on hamming code ecc   */
/*****************************************************/
ecc256(uchar* write_data, uchar* ecc_gen)
{
    for(i = 0; i < 256; i++)
    {
        paritc = paritc ^ (*(write_data+i));
        tmp = (*(write_data+i) & 0xf0) >> 4;
        tmp2 = *(write_data+i) & 0x0f;
        switch(tmp)
        {
            case 0:
                *(paritr + i) = *(data_table0 + tmp2);
                break;
            case 1:
                *(paritr + i) = *(data_table1 + tmp2);
                break;
            case 2:
                *(paritr + i) = *(data_table1 + tmp2);
                break;
            case 3:
                *(paritr + i) = *(data_table0 + tmp2);
                break;
            case 4:
                *(paritr + i) = *(data_table1 + tmp2);
                break;
            case 5:
                *(paritr + i) = *(data_table0 + tmp2);
                break;
            case 6:
                *(paritr + i) = *(data_table0 + tmp2);
                break;
            case 7:
                *(paritr + i) = *(data_table1 + tmp2);
                break;
            case 8:
                *(paritr + i) = *(data_table1 + tmp2);
                break;
            case 9:
                *(paritr + i) = *(data_table0 + tmp2);
                break;
            case 10:
                *(paritr + i) = *(data_table0 + tmp2);
                break;
            case 11:
                *(paritr + i) = *(data_table1 + tmp2);
                break;
            case 12:
                *(paritr + i) = *(data_table0 + tmp2);
                break;
            case 13:
                *(paritr + i) = *(data_table1 + tmp2);
                break;
```

APPENDIX-continued

```
        case 14:
            *(paritr + i) = *(data_table1 + tmp2);
            break;
        case 15:
            *(paritr + i) = *(data_table0 + tmp2);
            break;
    }
}
parit0c = ((paritc & 0x01) ? 1 : 0);
parit1c = ((paritc & 0x02) ? 1 : 0);
parit2c = ((paritc & 0x04) ? 1 : 0);
parit3c = ((paritc & 0x08) ? 1 : 0);
parit4c = ((paritc & 0x10) ? 1 : 0);
parit5c = ((paritc & 0x20) ? 1 : 0);
parit6c = ((paritc & 0x40) ? 1 : 0);
parit7c = ((paritc & 0x80) ? 1 : 0);
parit1__2 = parit6c ^ parit4c ^ parit2c ^ parit0c;
parit1__1 = parit7c ^ parit5c ^ parit3c ^ parit1c;
parit2__2 = parit5c ^ parit4c ^ parit1c ^ parit0c;
parit2__1 = parit7c ^ parit6c ^ parit3c ^ parit2c;
parit4__2 = parit3c ^ parit2c ^ parit1c ^ parit0c;
parit4__1 = parit7c ^ parit6c ^ parit5c ^ parit4c;
for(i = 0 ; i < 256;i++)    sum=sum ^ (*(paritr+i));
for (i = 0; i < 256; i = i+2)
    parit8__2 = parit8__2 ^ (*(paritr + i));
for (i = 0; i < 256; i = i+4)
{
    parit16__2 = parit16__2 ^ (*(paritr + i));
    parit16__2 = parit16__2 ^ (*(paritr + i + 1));
}
for (i = 0; i < 256; i = i+8)
{
    for (j = 0; j <= 3; j++)
        parit32__2 = parit32__2 ^ (*(paritr + i + j));
}
for (i = 0; i < 256; i+16)
{
    for (j = 0; j <= 7; j++)
        parit64__2 = parit64__2 ^ (*(paritr + i + j));
}
for (i = 0; i < 256; i = i+32)
{
    for (j = 0; j <= 15; j++)
        parit128__2 = parit128__2 ^ (*(paritr + i + j));
}
for (i = 0; i < 256; i = i+64)
{
    for (j = 0; j <= 31; j++)
        parit256__2 = parit256__2 ^ (*(paritr + i + j));
}
for (i = 0; i < 256; i = i+128)
{
    for (j = 0; j <= 63; j++)
        parit512__2 = parit512__2 ^ (*(paritr + i + j));
}
for (i = 0; i < 256; i = i+256)
{
    for (j = 0; j <= 127; j++)
        parit1024__2 = parit1024__2 ^ (*(paritr + i + j));
}
if(sum==0){
    parit1024__1=parit1024__2;
    parit512__1=parit512__2;
    parit256__1=parit256__2;
    parit128__1=parit128__2;
    parit64__1=parit64__2;
    parit32__1=parit32__2;
    parit16__1=parit16__2;
    parit8__1=parit8__2;
}
else{
    parit1024__1 = (parit1024__2 ? 0 : 1);
    parit512__1 = (parit512__2 ? 0 : 1);
    parit256__1 = (parit256__2 ? 0 : 1);
    parit128__1 = (parit128__2 ? 0 : 1);
    parit64__1 = (parit64__2 ? 0 : 1);
    parit32__1 = (parit32__2 ? 0 : 1);
    parit16__1 = (parit16__2 ? 0 : 1);
    parit8__1 = (parit8__2 ? 0 : 1);
}
parit1__2 <<= 2;
parit1__1 <<= 3;
parit2__2 <<= 4;
parit2__1 <<= 5;
parit4__2 <<= 6;
parit4__1 <<= 7;
parit128__1 <<= 1;
parit256__2 <<= 2;
parit256__1 <<= 3;
parit512__2 <<= 4;
parit512__1 <<= 5;
parit1024__2 <<= 6;
parit1024__1 <<= 7;
parit8__1 <<= 1;
parit16__2 <<= 2;
parit16__1 <<= 3;
parit32__2 <<= 4;
parit32__1 <<= 5;
parit64__2 <<= 6;
parit64__1 <<= 7;
*(ecc_gen + 0) = ~(parit64__1|parit64__2|parit32__1|parit32__2|
                    parit16__1|parit16__2|parit8__1|parit8__2);
*(ecc_gen + 1) = ~(parit1024__1|parit1024__2|parit512__1|
                    parit512__2|parit256__1|parit256__2|
                    parit128__1|parit128__2);
*(ecc_gen + 2) = ~(parit4__1|parit4__2|parit2__1|parit2__2|
                    parit1__1|parit1__2| 0x00| 0x00);
}
```

What is claimed is:

1. A system to detect and correct errors in a flash memory, comprising:
    an error detection circuit coupled to the flash memory, the error detecting circuit determining if an error occurs in accessing data from a physical block number (PBN) from the flash memory; and
    an error correction cache coupled to the error detection circuit, the cache storing one or more PBN entries related to one or more past data accesses and error correction information associated with the one or more PBN entries, the one or more PBN entries being used to determine whether a current data access involves substantially similar data as a past data access, wherein upon detecting an error and if the current data access involves substantially similar data as a past data access, error correction information associated with a PBN entry is applied to correct the error.

2. The system of claim 1, wherein the error correction information includes a corrected page of information or information used to correct the error.

3. The system of claim 1, wherein the error detection circuit generates a syndrome and the error correction information stored in the error correction cache includes a previously determined syndrome.

4. The system of claim 3, wherein the syndrome from the error detection circuit is compared with the previously determined syndrome and if the syndromes match, the error is corrected using the previously determined syndrome and otherwise the error correction information is updated with the syndrome generated by the error detection circuit.

5. The system of claim 1, wherein the error detecting circuit further comprises at least three error detection circuits corresponding to three selectable error detection modes, the error detection circuits being adapted to detect an error based on a selected mode of error detection and correction.

6. The system of claim 5, wherein the flash memory comprises an extra storage area and wherein the three modes of error detection and correction further comprises a first mode to correct one error, a second mode to correct two errors including errors in the extra storage area, and a third mode to correct three errors including errors in the extra storage area.

7. The system of claim 6, wherein the first mode protects against any one symbol error.

8. The system of claim 7, wherein the second mode protects against any two symbol errors, including those in the extra storage area.

9. The system of claim 8, wherein the third mode protects against any three symbol errors, including those in the extra storage area.

10. The system of claim 9, wherein the first mode comprises a Smart Media compatible mode, the second mode further comprises a Reed-Solomon 52 (RS-52) mode, and the third mode further comprises an RS-73 mode.

11. A method to detect and correct errors in a flash memory using an error correction cache, the method comprising:
   storing in the error correction cache one or more PBN entries related to one or more past data accesses;
   storing error correction information associated with the one or more PBN entries in the error correction cache;
   accessing data from a physical block number (PBN) of the flash memory;
   determining whether a current data access involves substantially similar data as a past data access using the one or more PBN entries; and
   upon detecting an error and if the current data access involves substantially similar data as a past data access, applying error correction information stored in the cache and associated with a PBN entry to correct the data error.

12. The method of claim 11, further comprising:
   detecting in hardware an error based on one of three selectable mode of error detection and correction; and
   correcting the error by executing error correction software corresponding to the selected mode of error detection and correction.

13. The method of claim 12, wherein the flash memory comprises an extra storage area and wherein the three modes of error detection and correction further comprises a first mode to correct one error, a second mode to correct two errors including errors in the extra storage area, and a third mode to correct three errors including errors in the extra storage area.

14. The method of claim 13, wherein the first mode protects against any one symbol error, the second mode protects against any two symbol errors, including those in the extra storage area, and the third mode protects against any three symbol errors, including those in the extra storage area.

15. The method of claim 13, wherein the first mode comprises a Smart Media compatible mode, the second mode further comprises a Reed-Solomon 52 (RS-52) mode, and the third mode further comprises an RS-73 mode.

16. The method of claim 11, wherein the error correction information includes a corrected page of information or information used to correct the error.

17. The method of claim 11, further comprising generating a syndrome for the data from the accessed PBN, wherein the error correction information stored in the error correction cache includes a previously determined syndrome.

18. The method of claim 17, further comprising comparing the generated syndrome the previously determined syndrome and if the syndromes match, correcting the error using the previously determined syndrome and otherwise updating the error correction information with the generated syndrome.

19. A system to detect and correct errors in a flash memory, comprising:
   a processor coupled to the flash memory, the processor adapted to access data from a physical block number (PBN) from the flash memory;
   an error detection circuit coupled to the flash memory and the processor, the error detecting circuit notifying the processor if an error occurs in the accessed PBN; and
   an error correction cache coupled to the processor, the cache storing one or more PBN entries related to one or more past data accesses and error correction information associated with the one or more PBN entries, the processor using the one or more PBN entries to determine whether a current data access involves substantially similar data as a past data access, wherein upon detecting an error and if the current data access involves substantially similar data as a past data access, the processor applying error correction information associated with a PBN entry to correct the error.

20. The system of claim 19, wherein the error correction information include a corrected page of information or information used to correct the error.

21. The system of claim 19, wherein the error detection circuit generates a syndrome and the error correction information stored in the error correction cache includes a previously determined syndrome.

22. The system of claim 21, wherein the syndrome from the error detection circuit is compared with the previously determined syndrome and if the syndromes match, the error is corrected using the previously determined syndrome and otherwise the error correction information is updated with the syndrome generated by the error detection circuit.

* * * * *